(12) United States Patent
Freeman et al.

(10) Patent No.: US 8,922,364 B2
(45) Date of Patent: Dec. 30, 2014

(54) RESCUE TIME TRACKER

(75) Inventors: Gary A. Freeman, Newton Center, MA (US); Mark Totman, Winchester, MA (US); Jon P. Cloutier, Thornton, CO (US); Ulrich Herken, Medford, MA (US); Colin Thomas, Shrewsbury (GB); Jeffrey Resnick, Foster City, CA (US)

(73) Assignee: ZOLL Medical Corporation, Chelmsford, MA (US)

( * ) Notice: Subject to any disclaimer, the term of this patent is extended or adjusted under 35 U.S.C. 154(b) by 140 days.

(21) Appl. No.: 13/555,422

(22) Filed: Jul. 23, 2012

(65) Prior Publication Data

US 2013/0049956 A1 Feb. 28, 2013

Related U.S. Application Data

(60) Provisional application No. 61/527,778, filed on Aug. 26, 2011.

(51) Int. Cl.
*G08B 1/08* (2006.01)
*G04F 10/00* (2006.01)

(52) U.S. Cl.
CPC ..................................... *G04F 10/00* (2013.01)
USPC ..................................... 340/539.12; 340/574

(58) Field of Classification Search
USPC ....................... 340/539.12, 574; 600/301, 504
IPC .................................................. G08B 1/00,7/00
See application file for complete search history.

(56) References Cited

U.S. PATENT DOCUMENTS

| | | | |
|---|---|---|---|
| 3,613,005 A | 10/1971 | Oschbach | |
| 5,613,491 A | 3/1997 | Kanner et al. | |
| 6,040,780 A | 3/2000 | Lucas | |
| 6,812,825 B1 | 11/2004 | Volk | |
| 7,075,429 B2 | 7/2006 | Marshall | |
| 7,400,245 B1 | 7/2008 | Johnson | |
| 7,928,851 B2 | 4/2011 | Stanners et al. | |
| 8,059,491 B1 | 11/2011 | Hennings-Kampa | |
| 2002/0122356 A1 | 9/2002 | Bourdeu | |
| 2004/0090950 A1* | 5/2004 | Lauber et al. | 370/352 |
| 2005/0135195 A1 | 6/2005 | Kreidler | |
| 2006/0129191 A1 | 6/2006 | Sullivan et al. | |
| 2006/0154642 A1 | 7/2006 | Scannell, Jr. | |
| 2008/0053445 A1 | 3/2008 | Kroupa et al. | |
| 2008/0177159 A1* | 7/2008 | Gavriely | 600/301 |
| 2011/0117878 A1 | 5/2011 | Barash et al. | |
| 2011/0295078 A1 | 12/2011 | Reid et al. | |

* cited by examiner

*Primary Examiner* — Shirley Lu
(74) *Attorney, Agent, or Firm* — Fish & Richardson P.C.

(57) ABSTRACT

This document relates to systems and techniques for providing response to emergency situations, such as traffic accidents, cardiac arrest, or other medical emergencies.

17 Claims, 6 Drawing Sheets

RESCUE TIME TRACKER

CROSS-REFERENCE TO RELATED APPLICATIONS

This is a utility of U.S. Provisional Application Serial No. 61/527,778 filed Aug. 26, 2011, All subject matter set forth in the above referenced application is hereby incorporated by reference into the present application as if fully set forth herein.

TECHNICAL FIELD

This document relates to systems and techniques for providing response to emergency situations, such as traffic accidents, cardiac arrest, or other medical emergencies.

BACKGROUND

Sudden health problems such as sudden cardiac arrest and injuries caused by accidents kill thousands of people and cause permanent injury every year. Fast and competent care can be essential to positive outcomes in such situations. For example, it is said that the chance of surviving a sudden cardiac arrest falls by ten percent for every minute in delaying effective treatment.

Emergency events like sudden cardiac arrests and accidents are generally responded to by organized emergency response units, such as ambulance or fire crews, and by laypeople who are immediately around the events so that they personally witness or offer assistance for the events. Often, the laypeople in a victim's immediate vicinity are not trained to treat the victim, or are too overwhelmed to provide effective treatment. On the other hand, the organized emergency response units may be far away from the victim, so that they cannot arrive at the scene for a long time.

SUMMARY

This document describes systems and techniques that may be used to coordinate treatment of a victim among responders, including lay responders and/or professional responders. The systems and techniques described herein include a rescue time tracker that provides information about the amount of time elapsed since the first contact of a rescuer with the victim. For example, a rescue time tracker can be affixed to a victim upon first contact of the rescuer with the victim and the rescue time tracker can provide a current elapsed time (e.g., provide an increasing time count beginning at contact) or a remaining length of effective treatment time (e.g., counting down from a pre-set total time with the countdown beginning upon initial contact).

In some additional examples, the rescue time tracker may be programmed to receive and store information during a rescue event. The rescue time tracker can additionally format the various types of information that were gathered during the treatment into a report. For example, additional information about events during the treatment of the victim prior to the victim's arrival in the hospital (e.g., initiation of CPR, defibrillation, drug administration, ventilation, etc.) can be recorded with the time from the rescue time tracker. Subsequently, the time count maintained by the rescue time tracker can be coordinated with a standard time (e.g., a time kept at the medical treatment facility) to provide a timeline of events during the rescue attempt.

In some additional examples, for a multiple-victim emergency or a potential mass casualty situation, separate rescue time trackers can be affixed to each victim. Providing separate rescue time tracker on each victim at the scene of a multi-victim emergency can facilitate in prioritizing treatment of the victims by the responders. For example, responders may be assigned to provide assistance to those with particular elapsed time ranges before providing assistance to other victims. In another example, the rescue time tracker can additionally allow input of an injury severity indicator and the responders may be assigned to provide assistance to those with particular injury severity levels (or combinations of severity levels and elapsed times) before providing assistance to other victims.

In some aspects, a rescue time tracking device for communicating information to a rescuer includes an adhesive layer on a first side of the rescue time tracking device for affixing the rescue time tracking device to a victim, timing circuitry configured to maintain time information relative to a time of initialization of the device, and a display portion on the second side of the rescue time tracking device configured to display the time information.

Embodiments can include one or more of the following.

The circuitry can be configured to maintain the time information comprises circuitry configured to initialize the device to a preset time upon initialization of the device and decrement a time count from the preset time subsequent to initialization of the device.

The circuitry can be configured to maintain the time information comprises circuitry configured to increment a time count from subsequent to initialization of the device.

The device can also include circuitry to determine when a predetermined amount of time has elapsed subsequent to initialization of the device and apply a visual indicia to the time information on the display portion upon the determination that the predetermined amount of time has elapsed.

The display portion can be further configured to display time information for one or more events related to the victim.

The device can also include a plurality of input devices, each input device being associated with an event, circuitry configured to record time information from the timing circuitry upon selection of a particular one of the plurality of input devices.

The display portion can be configured to display the recorded current time information for the event.

The device can also include a wireless transmitter configured to transfer the time information to a computing device.

The device can also include a backing affixed to the backside of the rescue time tracking device prior to initialization, wherein removal of the rescue time tracking device from the backing initializes the timing circuitry.

In some additional aspects, a computer-implemented method for communicating information to one or more medical responders can include receiving, from a plurality of rescue time tracking devices, at a central computing device location information that identifies a current location of a victim associated with a particular rescue time tracking device and time information from the rescue timing device and generating a display that identifies the location of the victims associated with the plurality of rescue timing devices and the timing information for the plurality of rescue timing devices.

Embodiments can include one or more of the following.

The method can also include receiving location information for the one or more medical responders.

Generating the display can include identifying the location of the one or more medical responders based on the received location information for the one or more medical responders.

The method can also include color coding the location of the victims on the display based on the timing information. The time information can include a time count decremented from a preset total time.

The time information can include an incrementing the time count with an initial time for the time count being based on a time of initialization of the time counter device.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Systems and techniques described herein include a rescue time tracker that provides information about the length of time that has elapsed since the first contact of a rescuer with the victim. A rescue time tracker can be affixed to a victim upon first contact of the rescuer with the victim and the rescue time tracker can provide a current elapsed time or a remaining amount of effective treatment time. The time-based information can provide guidance to a rescuer about how to effectively treat the victim. In some additional examples, the timer can provide information about the length of time that has elapsed since a time of dispatch of emergency response personnel, defibrillator power-on, time of arrival at the emergency department or other treatment facility, or time of symptom onset. The start time for the timer could be automatically transmitted from a tablet or AED or input directly into the rescue time tracker via one or more inputs.

Figure 1:
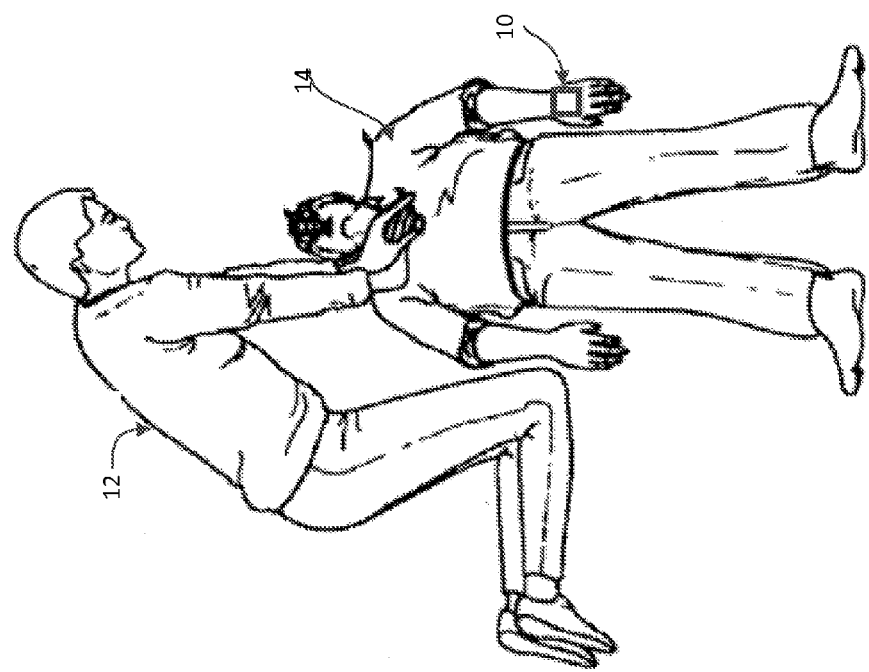
FIG. 1 is a conceptual diagram showing emergency response.
Figure 3:
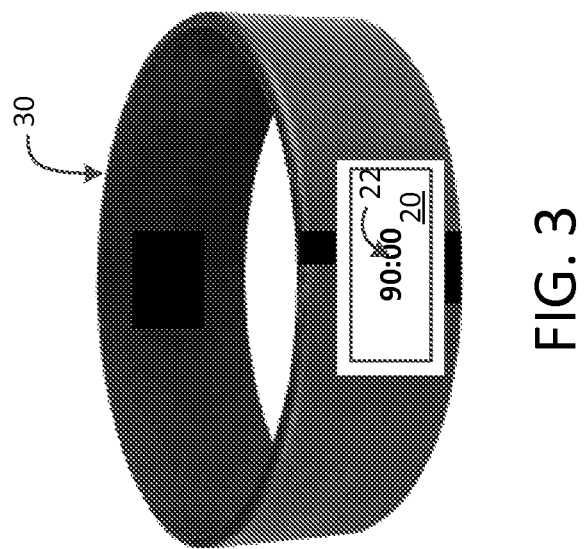
FIG. 3 is a diagram of an exemplary rescue time tracker.

FIG. 1 is a diagram of a scene of an emergency. A rescuer 12 provides emergency treatment and assistance to a victim 14, such as a victim suffering from sudden cardiac arrest or a victim at the scene of an accident. Upon contact with the victim 14, the rescuer affixes a rescue time tracker 10 to the victim. For example, the rescue time tracker 10 can be applied using an adhesive substance to the victim's skin such as on the victim's hand, forehead, or chest. Alternatively, the rescue time tracker can be secured around the victim's wrist or ankle (e.g., as shown in FIG. 3). The rescue time tracker 10 provides a visual and/or audible indication of the elapsed time subsequent to the victim experiencing trauma or subsequent to the initial contact with the victim by a rescuer.

In some examples, rescue time tracker 10 can be a specialized type of clock that acts as a timer and counts down from a specified time interval (e.g., a time interval established based on the condition of the victim) or that acts as a stopwatch counts upwards from zero for measuring elapsed time.

The rescue time tracker 10 can be mechanical, electromechanical, electronic (quartz), or even software-based.

The rescue time tracker 10 provides a visual indication to the rescuer or to other medical personnel who come into contact with the victim 14 regarding the length of time that has elapsed since contact with the victim 14 was first established. The information can be presented as a total elapsed time or as a time remaining for effective treatment. The rescuer or medical personnel can use the information from the rescue time tracker 10 to guide decisions about care administered to the victim. For example, if a large amount of time has elapsed since the initiation of treatment and the victim 14 is still unresponsive to the treatment more aggressive treatment options might be used than if treatment had only recently been initiated.

In some examples, the rescue time tracker 10 can include additional visual indicia to provide information about the status of the victim 14. For example, time-based thresholds can be used to provide high-level visual information to the rescuer 12 about the length of time that has elapsed (in addition to the displayed time). For example, as the elapsed time increases the color of the display can change.

In one particular example, during a first time period, the display can be green, and then change to yellow during a second time period, and finally to red during a third time period. The time periods can be based on time thresholds associated with treatment of the condition. For example, for cardiac arrest, the counter could count down from 90 minutes and display could be green from 90 minutes to 70 minutes, yellow from 69 minutes to 30 minutes, and red from 30 minutes to zero minutes. As such, even if the rescuer does not have knowledge about the length of effective treatment time for a particular condition, the rescuer 12 can still receive feedback from the rescue time tracker 10 about the status of the rescue and remaining time during which efforts to rescue the victim 10 are likely to be effective.

Figure 2A:
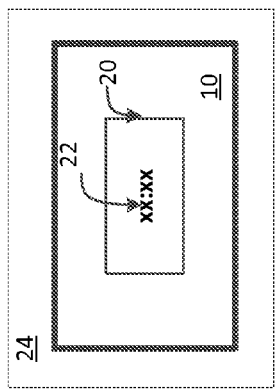
FIGS. 2A-2C are diagrams of an exemplary rescue time tracker.
Figure 2B:
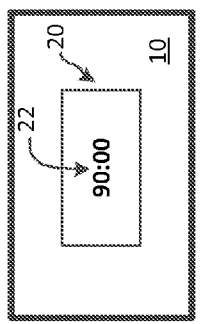
Figure 2C:
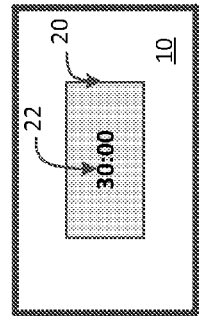

FIGS. 2A-2C show an example of a rescue timer 10. More particularly, FIG. 2A shows the rescue timer 10 prior to initialization, FIG. 2B shows the rescue timer 10 at the time of initialization, and FIG. 2C shows the rescue timer 10 at a subsequent time during use of the rescue timer 10.

The rescue timer 10 includes a display portion 20 that displays a time counter 22. The time counters 22 shown in FIG. 2A-2C displays minutes and seconds. Alternatively, the time can be displayed in other formats such as minutes only or hours and minutes.

As shown in FIG. 2A, prior to initialization, the time counter 22 can initially be blank or show a non-time based entry such as xx:xx (as shown in FIG. 2A) to indicate that the device has not been previously used. Alternatively, the time counter 22 can display the initial time for the counter prior to enabling the counter. For example, if the counter is configured to count down a particular length of time the time counter 22 can display to length of time (e.g., 90 minutes, 60 minutes) or if the counter is configured to count up the time counter 22 can initially display 00:00 prior to initialization.

Prior to initialization, the rescue time tracker 10 can be affixed to a backing 24. Removal of the backing can initialize/enable the rescue time tracker 10. For example, the rescue time tracker can include a circuit that is completed upon removal of the backing 24 or the backing 24 can include a portion prohibiting contact of a battery with a counter circuit prior to removal of backing 24 such that removal of the backing 24 powers and initializes the rescue time tracker 10. In other examples, the rescue timer 10 can be enabled using other methods such as depressing a button, removing a tab to allow contact with a battery, etc.

In some examples, the rescue time tracker 10 can be in the form of a sticker with the display of the time counter on a front side of the sticker and an adhesive substance on a back side of the sticker. Removal of the backing 24 can expose an adhesive substance on a backside of the rescue time tracker 10 to allow the rescue time tracker 10 to be affixed to the victim.

FIG. 2B shows the rescue timer 10 at the time that the device is initialized and begins to track the time information for the victim 14. The removal of backing 24 initializes the rescue timer 10 and the time counter 22 initially displays the total amount of time for potentially effective treatment. The time period is preset such that initialization does not require the rescuer 12 to manually input the total time. Automatically initializing the rescue time tracker 10 using a pre-set time period on the rescue timer 12 can allow various rescuers and medical personnel to have a known point of reference for the time displayed on the rescue timer 12. In this example, the rescue timer is initially set to ninety minutes and counts down from ninety minutes. However, other time periods can be used. Exemplary time periods for various conditions are provided in the table below:

| Condition | Exemplary time period |
| --- | --- |
| Cardiac Arrest | 80-100 minutes (e.g., 90 minutes) |
| Stroke | 45-90 minutes (e.g., 60 minutes) |
| | Additional time periods or reminders can be set based on one or more of: |
| | 60 min door to needle time |
| | 25 min for CT scan or MRI after arrival at ED |
| | interpretation within 45 min. 45 min for platelet counts. |
| | 10 min to patient evaluation after ED arrival. |
| | 15 min to notify stroke time after arrival. |
| Myocardial infarction | 80-100 minutes (e.g., 90 minutes) |
| | Additional time periods or reminders can be set based on one or more of: |
| | Door to balloon time of ≤90 minutes |
| | fibrinolysis within 30 min if applicable (from EMS arrival or hospital arrival) |
| Trauma | 45-90 minutes (e.g., 60 minutes) |

FIG. 2C shows the rescue timer 10 at a time subsequent to initialization of the rescue timer. As shown in FIG. 2C and described above, a visual indicia (e.g., the coloration or shading of portion 20) can be used to indicate a critical time period. In some examples, the critical time period can alert the rescuer to the end of the "golden hour" or the end of the first sixty minutes after major traumatic injury. As shown in FIG. 2C, for a rescue timer initially set to ninety minutes, the visual indicia is displayed after one hour, namely at 30 minutes remaining. While the example shown in FIG. 2C applies a visual indicia to indicate the end of the "golden hour" other timer periods for applying visual indicia can be set based on the medical condition.

In some additional examples, multiple time periods each being associated with a different visual indicia can be displayed with the time count 22.

FIGS. 3 shows another example of a rescue time tracker that includes a display portion 20 that provides a time counter 22. In contrast to the exemplary embodiments in which the rescue time tracker is included in a sticker, the rescue time tracker shown in FIG. 3 is included in a band 30 that can be placed around the hand or wrist of a victim. The band 30 can be formed of plastic, silicone, or other materials.

In some additional examples, a rescue time tracker that includes a display portion that provides a time counter can be integrated into a defibrillation device. For example, the rescue time tracker can be incorporated into defibrillation electrode pads affixed to the victim's chest.

Figure 4:
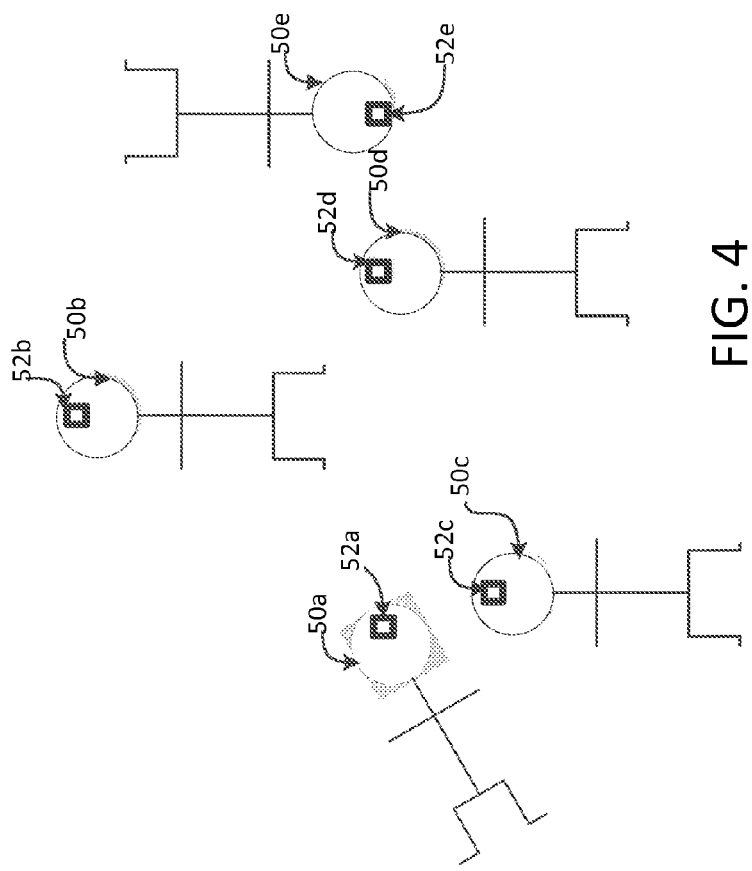
FIG. 4 is a diagram of a multiple-victim emergency.

Referring to FIG. 4, in some examples, rescue time trackers can be deployed at the scene of a mass emergency or mass casualty event to provide rescue workers with information about the victims. For example, multiple victims 50a-50e can each be labeled with a rescue time tracker 52a-52e that provides an indication of an amount of time that has elapsed since a rescue worker was first in contact with the victim. The times on the rescue time trackers can help the rescue workers to prioritize treatment of the victims 50a-50e.

Figure 5:
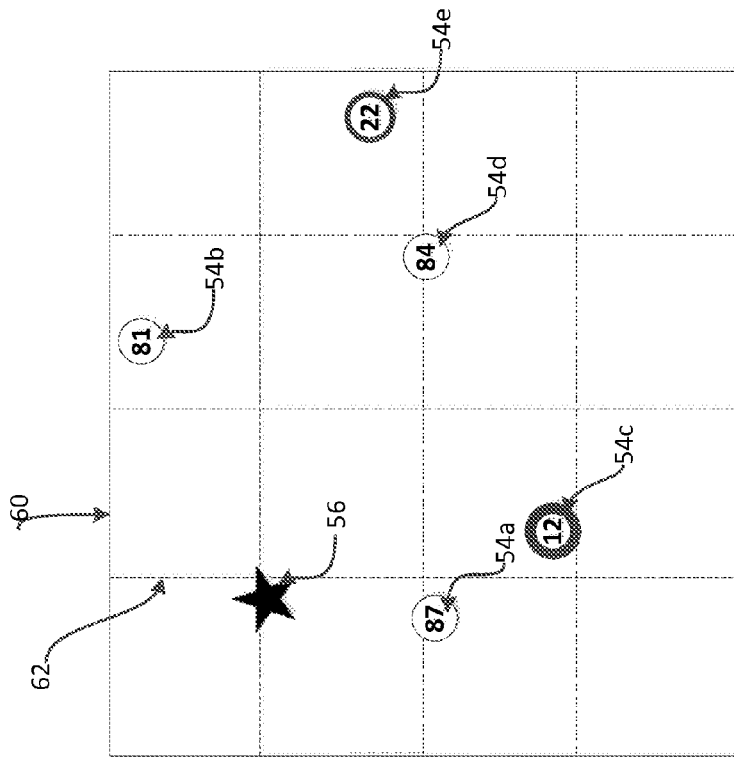
FIG. 5 is an exemplary display of a multiple-victim emergency.

In some examples, each of the rescue time trackers 52a-52e can include a locator that communicates wirelessly with a computing device (not shown). For example, the locator can be a GPS device that provides location information to the computing device. Alternatively, the locator can be a RFID device that provides location information to the computing device. Upon receipt of location information from multiple trackers 52a-52e, as shown in FIG. 5, the computing device generates a user interface that includes a map 60 and indicators 54a-54c identifying the relative locations of the victims 50a-50e on a grid 62.

In some examples, the rescue time trackers 52a-52e can additionally transmit the time kept on the rescue time tracker to the computing device and the indicators 54a-54c displayed on the map 60 can include an indication of the time associated with each rescue time tracker 52a-52e, By providing the time associated with each rescue time tracker on the map 60, a rescuer can more readily assess where he/she is most needed.

In some implementations, additional visual indicia (e.g., color coding, blinking indicators, different indictors) can be provided based on the time of the associated rescue time tracker. For example, in FIG. 5, indicators 54c and 54e are shown with a thicker circle to indicate that a greater amount of time has passed in relation to the other rescue time trackers.

A rescuer can additionally possess or wear a locator device such that the map 60 can include visual indicia 56 representing the location of the rescuer (or multiple rescuers). This can allow a rescuer to determine his/her location relative to the locations of the victims.

In some additional examples, other information to aid the rescuer can be displayed on the map 60. For example, icons representing various equipment can be provided such as icons having thunderbolts on them represent AED's that a responder may grab and take to the victim 102 when the victim has suffered a sudden cardiac arrest. Icons having a "+" on them may represent first aid kits that responders could use to bandage or otherwise treat victims of an accident. Examples of additional information that can be displayed on the map with the location information from the rescue time trackers is described for example in U.S. Patent Application Ser. No. 12/946,803 filed on Nov. 15, 2010 and entitled "Community Based Rescue," the contents of which are hereby incorporated by reference in its entirety.

Figure 6A:
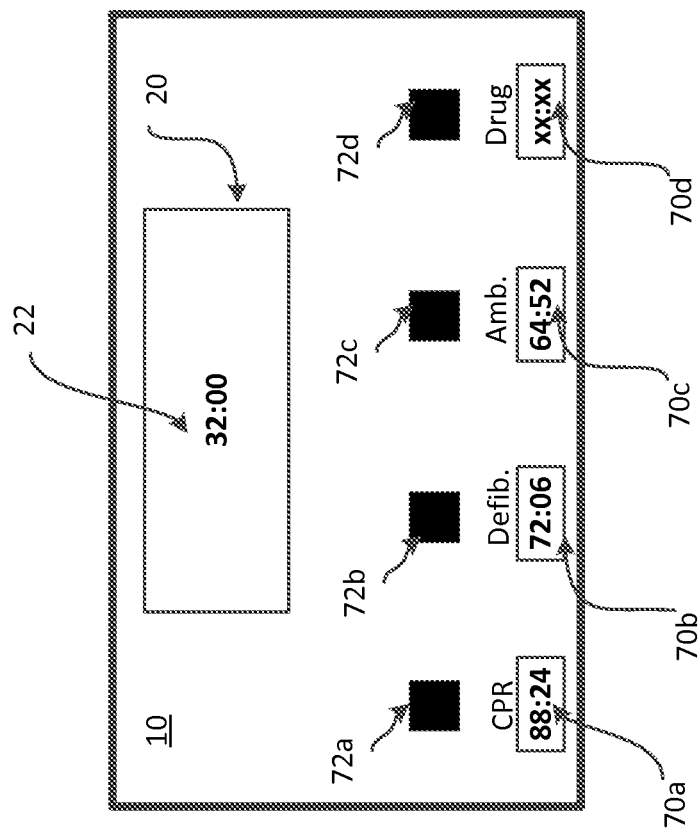
FIG. 6A is a diagram of an exemplary rescue time tracker.

Referring now to FIG. 6A, in some embodiments, a rescue time tracker device 10 can include a display portion 20 that provides a time counter 22 (e.g., such as the time counter 22 described herein) and additional inputs/displays to capture/record/display time information for major events in the treatment of the victim. In the example of FIG. 5, the rescue time tracker 10 includes display portions 70a, 70b, 70c, and 70d that provide timing information about major events such as initiation of CPR (display portion 70a), defibrillation (display portion 70b), loading of the patient into an ambulance (display portion 70c), and drug administration (display portion 70d). A rescuer can record/store time information for each of the major events by pressing an associated button or other input device on the rescue time tracker device 10. In the example of FIG. 5, the rescue time tracker 10 includes buttons 72a, 72b, 72c, and 72d and depressing the button stores the current time of the time counter 22.

In some additional examples, the rescue time tracker can include an alarm or other visual or audio indicator. The alarm can be set to remind a rescuer to perform a particular action. For example, at the scene of a mass casualty, the alarm could remind rescuers to deliver drugs, hang a new IV bag, refill a gas line, etc.

While the example of FIG. 5 included input devices to capture information about CPR, defibrillation, loading of a patient into an ambulance, and drug administration, other information can be stored by the rescue time tracker device 10. For example, ROSC, arrival ED, cooling started, advanced airway placement.

In some embodiments, it can be beneficial to transfer the data from the rescue time tracker 10 to another computing device and/or to synchronize the time information from the rescue time tracker 10 to a current standard time (e.g., a current absolute/solar time such as the time kept by a clock as opposed to a count of hours and minutes from a reference time, $t_0$). In order to transfer the information from the rescue time tracker 10 to the computing device, the rescue time tracker 10 can include a wireless transmitter and/or in input/output port configured to transmit the data.

Figure 7:
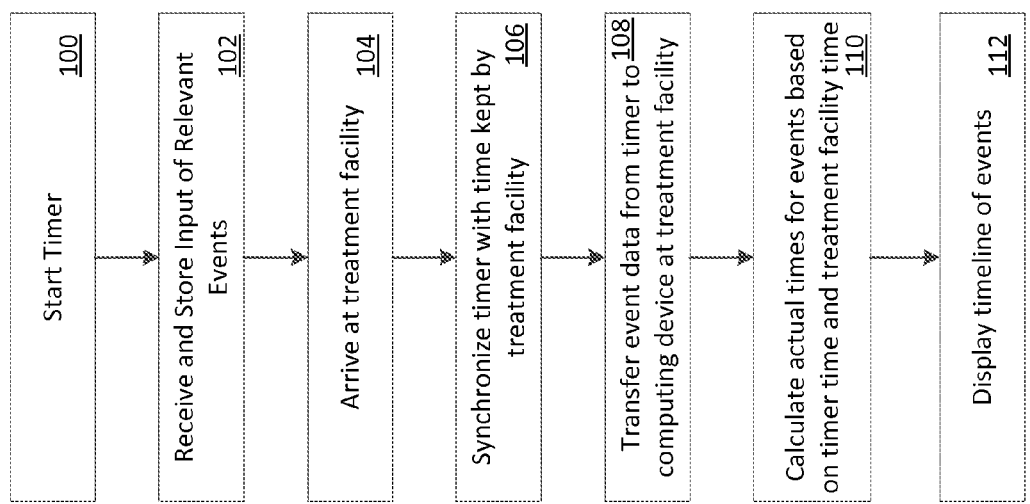
FIG. 7 is a flow chart of a process for generating a rescue timeline.

FIG. 7 shows and exemplary process for synchronizing time information from a rescue time tracker 10 with a standard time and generating a timeline of events related to the treatment of the victim. The process begins with the identification of a victim and the initialization or starting of the timer (block 100). As described above, the timer can be initialized by removing a backing from the device, pulling a tab to allow contact with a battery, or by selecting a start button.

At block 102, the rescue time tracker device receives and stores time information related to various events. As described above, the time information for various events can be captured from the timer based on depression of a button or other input provided by the rescuer.

At block 104, the victim arrives at a treatment facility such as a hospital, medical facility, or ambulance.

At block 106, the time kept by the rescue time tracker is synchronized with a standard time kept by the treatment facility. Synchronizing the rescue time tracker and the standard time can include associating a current time count on the rescue time tracker with a current standard time of the treatment facility.

Figure 6B:
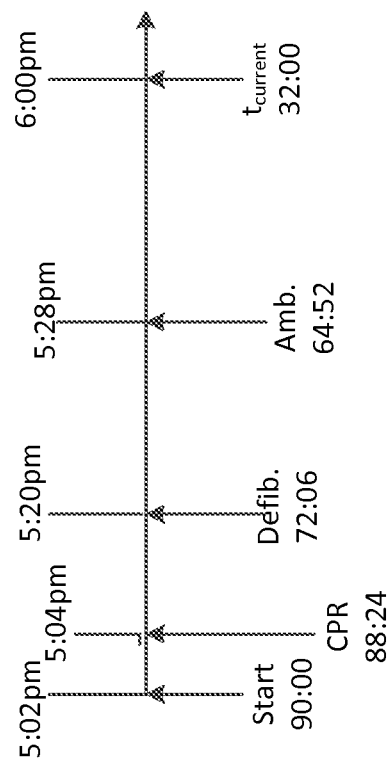
FIG. 6B shows an example of a timeline generated based on information from a rescue time tracker.

For example, referring back to the example of FIG. 6A, rescue time tracker 10 was initialized to a time of 90:00 and counted down to the current time of 32:00, Thus, the time of 32:00 can be equated to a current, standard time of the treatment facility. This current, standard time of the treatment facility can subsequently be used as a reference time for calculating relative times for events. For example, assuming the current time at the treatment facility is 6:00 pm EST, the time of 32:00 can be associated with the standard time of 6:00 pm EST (as shown in FIG. 6B).

At block 108, event data from the rescue time tracker is transferred from the rescue time tracker to a computing device. For example, the time data from the rescue time tracker and an identification of the relevant event can be transferred to the computing device using a wired or wireless interface.

At block 110, the computing device calculates standard times for the events based on the time information received from the rescue time tracker and the determined reference time. More particularly, the computing device determines the amount of between a particular event and the reference time. For example, a difference between the timer count associated with the reference time (e.g., as determined at block 106) can be calculated and the same difference can be applied to the reference time to determine an actual, standard time for the event.

For example, referring back to the example of FIG. 6A, rescue time tracker 10 captured timing data of 88:24 for initiation of CPR, 72:06 for defibrillation, and 64:52 for ambulance. The, the time of 32:00 was equated to a current, standard time of 6:00 pm EST. Thus, timing information for the events can be determined relative to the 6:00 pm EST reference time. Using the example of the CPR initiation, 56 minutes and 24 seconds elapsed between the initiation of CPR (88:24) and the reference time associated with a time count (32:00). Thus, as shown in FIG. 6B, a standard time of 56 minutes and 24 seconds before the reference time of 6:00 pm EST (e.g., 5:04 pm EST) can be associated with the initiation of CPR.

At block 112, the computing device generates a timeline of events based on the calculated times. The timeline of events can be displayed on a user interface of the computing device. An exemplary timeline is shown in FIG. 6B.

In some aspects, the timing information and other information (if applicable) from the rescue timer is combined with relevant data from multiple, other EMS devices (including but not limited to a defibrillator monitoring a patient, a patient charting device, dispatch information device, and a navigation device). A system organizes and stores the information, and displays it in real-time on a screen in the back of an ambulance, to a hospital, and/or other location such as a physician's home, via a web browser interface. Thus, the information from the rescue timer can be incorporated into a larger set of patient data gathered from multiple, different devices used in the treatment of the patient. An exemplary system for combining information from multiple different devices is described, for example, in U.S. 61/322678 filed on April 9, 2010 and titled "SYSTEMS AND METHODS FOR COLLECTION, ORGANIZATION AND DISPLAY OF EMS INFORMATION," the contents of which are hereby incorporated by reference. For example, the rescue timer described herein can be communicatively coupled to the system described in U.S. 61/322678 to allow timing information from the rescue timer to be incorporated with other information gathered about a patient and treatment of the patient.

Figure 8:
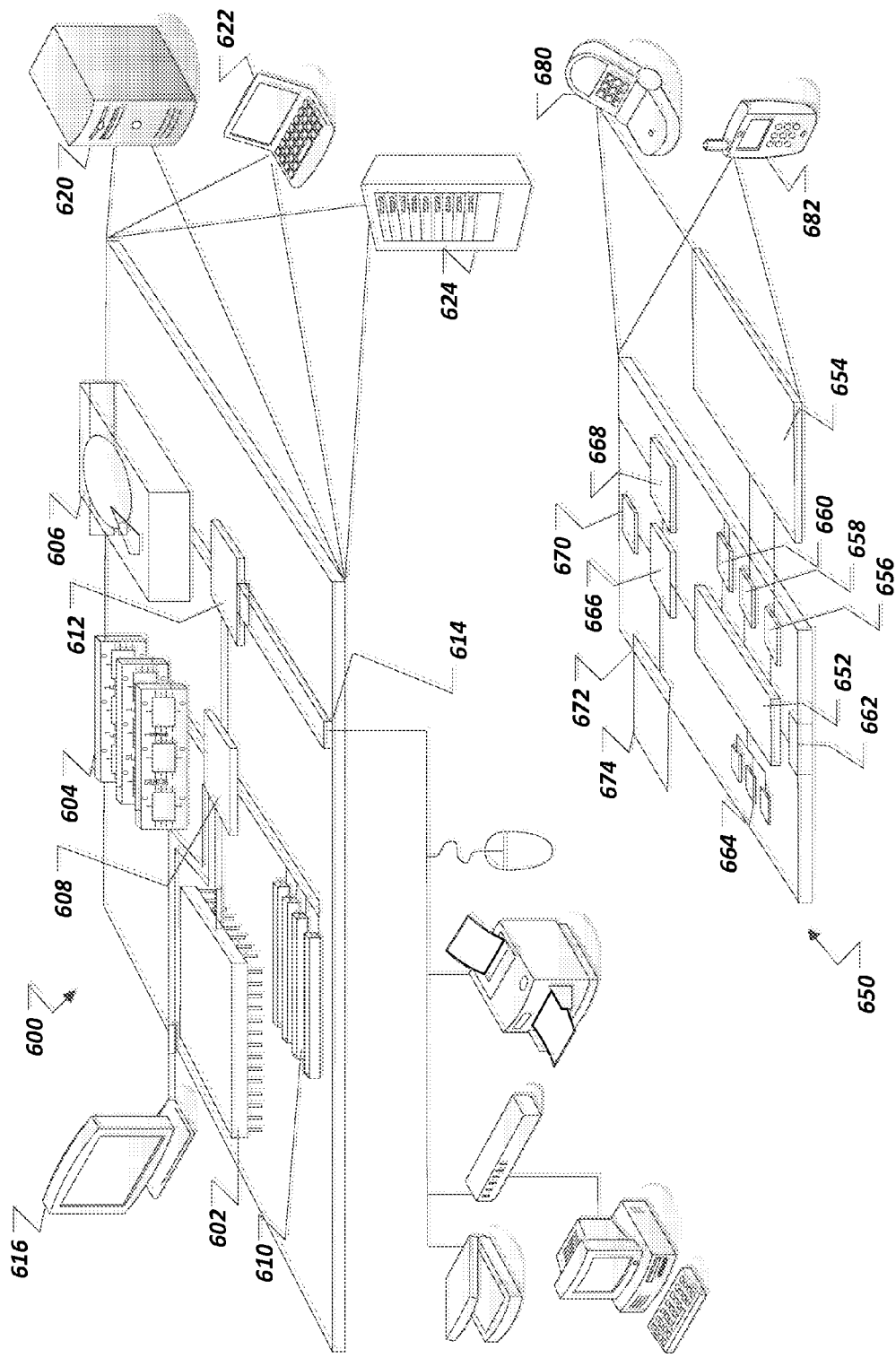
FIG. 8 is a diagram of a computer system.

FIG. 8 shows an example of a generic computer device 600 and a generic mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, and an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. he memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to smartphones and similar client devices, but other forms of devices may be employed In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A rescue time tracking device for communicating information to a rescuer, the device comprising:
   an adhesive layer on a first side of the rescue time tracking device for affixing the rescue time tracking device to a victim;
   timing circuitry configured to maintain time information relative to a time of initialization of the device;
   a backing removably affixed to the adhesive layer on the first side of the rescue time tracking device prior to initialization, wherein removal of the rescue time tracking device from the backing to expose the adhesive layer initializes the timing circuitry; and
   a display portion on the second side of the rescue time tracking device configured to display the time information.

2. The rescue time tracking device of claim 1, wherein the circuitry configured to maintain the time information comprises circuitry configured to initialize the device to a preset time upon initialization of the device and decrement a time count from the preset time subsequent to initialization of the device.

3. The rescue time tracking device of claim 1, wherein the circuitry configured to maintain the time information comprises circuitry configured to increment a time count from subsequent to initialization of the device.

4. The rescue time tracking device of claim 1, further comprising circuitry to determine when a predetermined amount of time has elapsed subsequent to initialization of the device and apply a visual indicia to the time information on the display portion upon the determination that the predetermined amount of time has elapsed.

5. The rescue time tracking device of claim 1, wherein the display portion is further configured to display time information for one or more events related to the victim.

6. The rescue time tracking device of claim 1, further comprising:
   a plurality of input devices, each input device being associated with an event;
   circuitry configured to record time information from the timing circuitry upon selection of a particular one of the plurality of input devices; and
   wherein the display portion is configured to display recorded time information for the event.

7. The rescue time tracking device of claim 1, further comprising:
   a wireless transmitter configured to transfer the time information to a computing device.

8. The rescue time tracking device of claim 4, wherein the circuitry to apply a visual indicia to the time information on the display portion is configured to cause the display portion to blink upon the determination that the predetermined amount of time has elapsed.

9. The rescue time tracking device of claim 4, wherein the circuitry to apply a visual indicia to the time information on the display portion is configured to change a color of the display portion upon the determination that the predetermined amount of time has elapsed.

10. The rescue time tracking device of claim 4, wherein the circuitry to apply a visual indicia to the time information on the display portion is further configured to:
    determine when a first predetermined amount of time has elapsed subsequent to initialization of the device;
    change the color of the display portion from green to yellow upon the determination that the first predetermined amount of time has elapsed;
    determine when a second predetermined amount of time has elapsed subsequent to initialization of the device; and
    change the color of the display portion from yellow to red upon the determination that the second predetermined amount of time has elapsed.

11. The rescue time tracking device of claim 6, wherein the event is selected from the group consisting of initiation of CPR to the victim, initiation of defibrillation to the victim, loading of the victim into an ambulance, and drug administration to the victim.

12. The rescue time tracking device of claim 6, wherein each event has a corresponding subportion of the display portion that is configured to display the recorded time information for the corresponding event.

13. The rescue time tracking device of claim 1, further comprising:
    an alarm in communication with the timing circuitry, the alarm configured to generate an alert when a predetermined amount of time has elapsed subsequent to initialization of the device.

14. The rescue time tracking device of claim 1, further comprising:
    a locator configured to communicate with a computing device.

15. The rescue time tracking device of claim 1, wherein the locator is a GPS device that is configured to provide location information to the computing device.

16. The rescue time tracking device of claim 1, wherein the locator is an RFID device that is configured to provide location information to the computing device.

17. The rescue time tracking device of claim 1, wherein the rescue time tracking device is incorporated into a defibrillation electrode pad of a defibrillation device.

* * * * *